US012479223B2

(12) United States Patent

Hanawa et al.

(10) Patent No.: US 12,479,223 B2

(45) Date of Patent: Nov. 25, 2025

(54) PRINTING DEVICE

(71) Applicant: SEIKO EPSON CORPORATION, Tokyo (JP)

(72) Inventors: Keita Hanawa, Matsumoto (JP); Tatsuya Ito, Shiojiri (JP); Ryo Nishikawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 150 days.

(21) Appl. No.: 18/477,610

(22) Filed: Sep. 29, 2023

(65) Prior Publication Data

US 2024/0109351 A1 Apr. 4, 2024

(30) Foreign Application Priority Data

Sep. 30, 2022 (JP) ................................ 2022-157639

(51) Int. Cl.

| | |
|---|---|
| ***B41J 29/02*** | (2006.01) |
| ***B41J 2/14*** | (2006.01) |
| ***B41J 29/42*** | (2006.01) |

(52) U.S. Cl.

CPC ................ *B41J 29/02* (2013.01); *B41J 2/14* (2013.01); *B41J 29/42* (2013.01)

(58) Field of Classification Search

CPC ..... B41J 29/02; B41J 2/14; B41J 29/42; B41J 25/304; B41J 2/1752; B41J 11/005; B41J 29/38; B41J 25/001

See application file for complete search history.

(56) References Cited

U.S. PATENT DOCUMENTS

| | | | | |
|---|---|---|---|---|
| 2002/0122093 A1* | 9/2002 | Otsuka | ...................... | B41J 2/15 347/40 |
| 2002/0146266 A1 | 10/2002 | Tanaka et al. | | |
| 2022/0134761 A1* | 5/2022 | Yamada | .................. | B41J 29/02 347/36 |

FOREIGN PATENT DOCUMENTS

| | | |
|---|---|---|
| JP | 2002-254746 A | 9/2002 |

* cited by examiner

*Primary Examiner* — Jannelle M Lebron

(74) *Attorney, Agent, or Firm* — Dority & Manning, P.A.

(57) ABSTRACT

A printing device 10 includes a head unit 39 configured to eject liquid onto a medium; a first movement section 37 configured to move the head unit 39 in a width direction X; a guide frame 40 configured to guide movement of the head unit 39 in a width direction X; and a second movement section 38 configured to move the first movement section 37 in a forward and rearward direction Y intersecting the width direction X, wherein the guide frame 40 includes a first bent section 81 formed by bending a metal plate along the width direction X and a second bent section 82 formed by bending the metal plate along the width direction X, and guides the head unit 39 by a first guide section 84, which is between the first bent section 81 and the second bent section 82.

5 Claims, 5 Drawing Sheets

PRINTING DEVICE

The present application is based on, and claims priority from JP Application Serial Number 2022-157639, filed Sep. 30, 2022, the disclosure of which is hereby incorporated by reference herein in its entirety.

BACKGROUND

1. Technical Field

The present disclosure relates to a printing device such as a printer.

2. Related Art

For example, there is a recording device, such as JP-A-2002-254746, which is an example of a printing device that ejects ink, which is an example of liquid, from a recording head and performs recording on a recording sheet. The recording device includes a carriage, which is an example of a head unit, and a first carriage guide plate, which is an example of a guide frame. The carriage has mounted thereon a recording head. The carriage moves the recording head in a main scanning direction, which is an example of a first direction.

The first carriage guide plate includes a first position restricting surface and a second position restricting surface. The first position restricting surface restricts the carriage in the vertical direction. The second position restricting surface restricts the carriage in a sub-scanning direction, which is an example of a second direction. The recording device moves the carriage in the main scanning direction and transports the recording sheet in the sub-scanning direction to perform recording.

In JP-A-2002-254746, the recording device moves the carriage in the main scanning direction, but vibration and load generated when the carriage is moved in the sub-scanning direction are not taken into consideration. Therefore, rigidity of the second position restricting surface is insufficient for moving the carriage in the sub-scanning direction, and printing quality may not be maintained.

SUMMARY

A printing device that solves the above-described problem includes a head unit configured to eject liquid onto a medium; a first movement section configured to move the head unit in a first direction; a guide frame configured to guide movement of the head unit in the first direction; and a second movement section configured to move the first movement section in a second direction intersecting the first direction, wherein the guide frame includes a first bent section formed by bending a metal plate along the first direction and a second bent section formed by bending the metal plate along the first direction, and guides the head unit by a guide section, which is between the first bent section and the second bent section.

DESCRIPTION OF EMBODIMENTS

Embodiments

Hereinafter, an embodiment of a printing device will be described. The printing device is, for example, an inkjet printer.

In the following description, a direction intersecting (for example, orthogonal to) a vertical direction Z is defined as a width direction X, and a direction intersecting the vertical direction Z and the width direction X is defined as a forward and rearward direction Y. One of the width directions X is defined as a first width direction X1, and the other of the width directions X is defined as a second width direction X2. One of the forward and rearward directions Y is defined as a forward direction Y1, and the other of the forward and rearward directions Y is defined as a rearward direction Y2. An upward direction of the vertical direction Z is defined as an upward direction Z1, and a downward direction of the vertical direction Z is defined as a downward direction Z2. The width direction X corresponds to an example of a first direction. The forward and rearward direction Y corresponds to an example of a second direction. The vertical direction Z corresponds to an example of a third direction.

Figure 1:
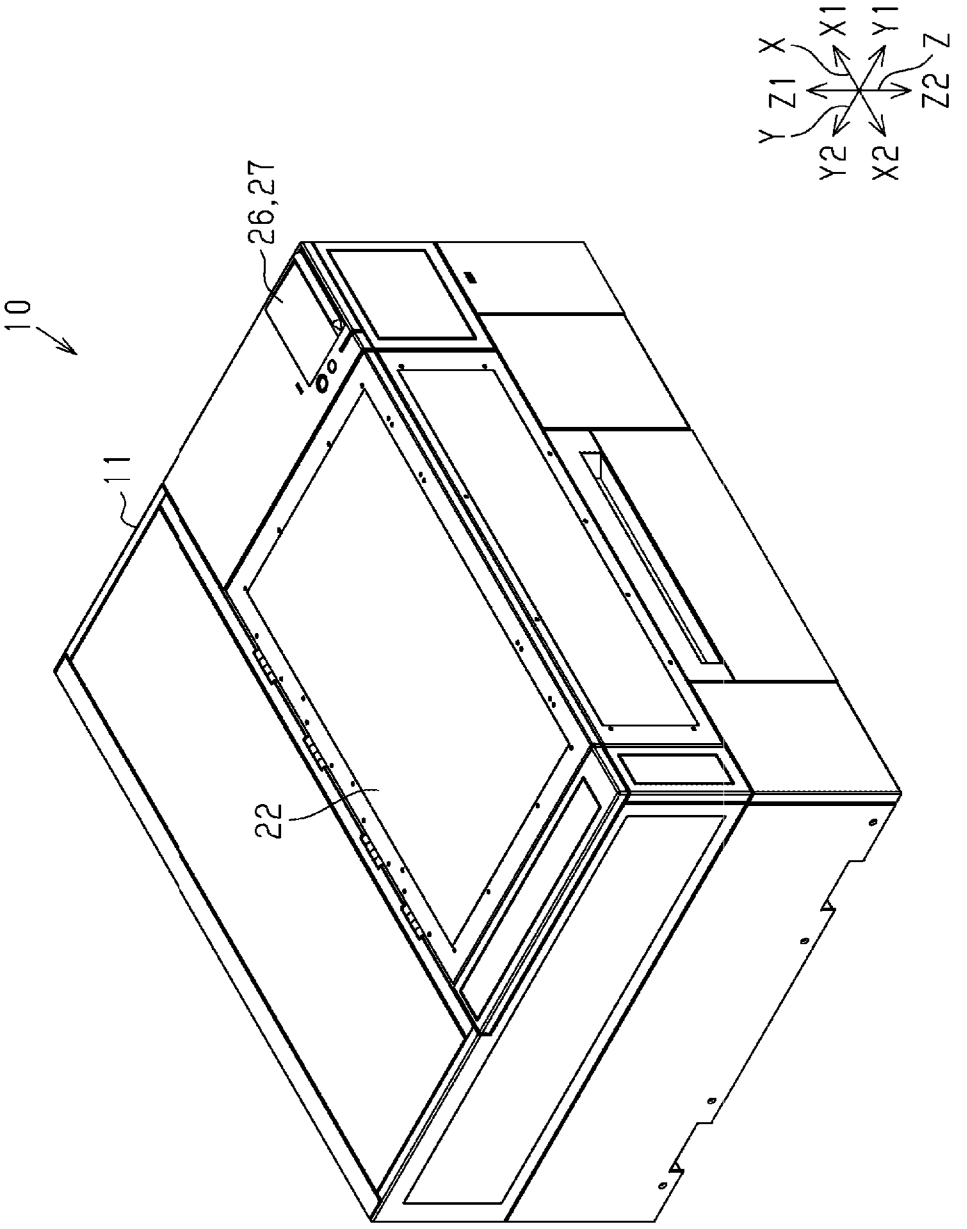
FIG. 1 is a perspective view showing a printing device.

Printing Device 10 as shown in FIG. 1, a printing device 10 is configured to perform printing on a medium. The printing device 10 may be configured to perform printing on the medium by ejecting liquid. The printing device 10 may be configured to perform printing on a flexible medium such as a T-shirt. The printing device 10 may be configured such that the medium is placed therein by a user.

The printing device 10 may include a housing 11, an opening and closing cover 22, a display section 26, and an operation section 27.

The housing 11 is configured to accommodate various members included in the printing device 10. The opening and closing cover 22 is movable between a closed position shown in FIG. 1 and an open position (not shown). When the opening and closing cover 22 is located at the open position, various members accommodated in the housing 11 are exposed. The display section 26 is configured to display information. The operation section 27 is configured to be operable by a user. The display section 26 and the operation section 27 may be integrally configured like a touch panel, or may be separately configured.

Medium Support Section 28

Figure 2:
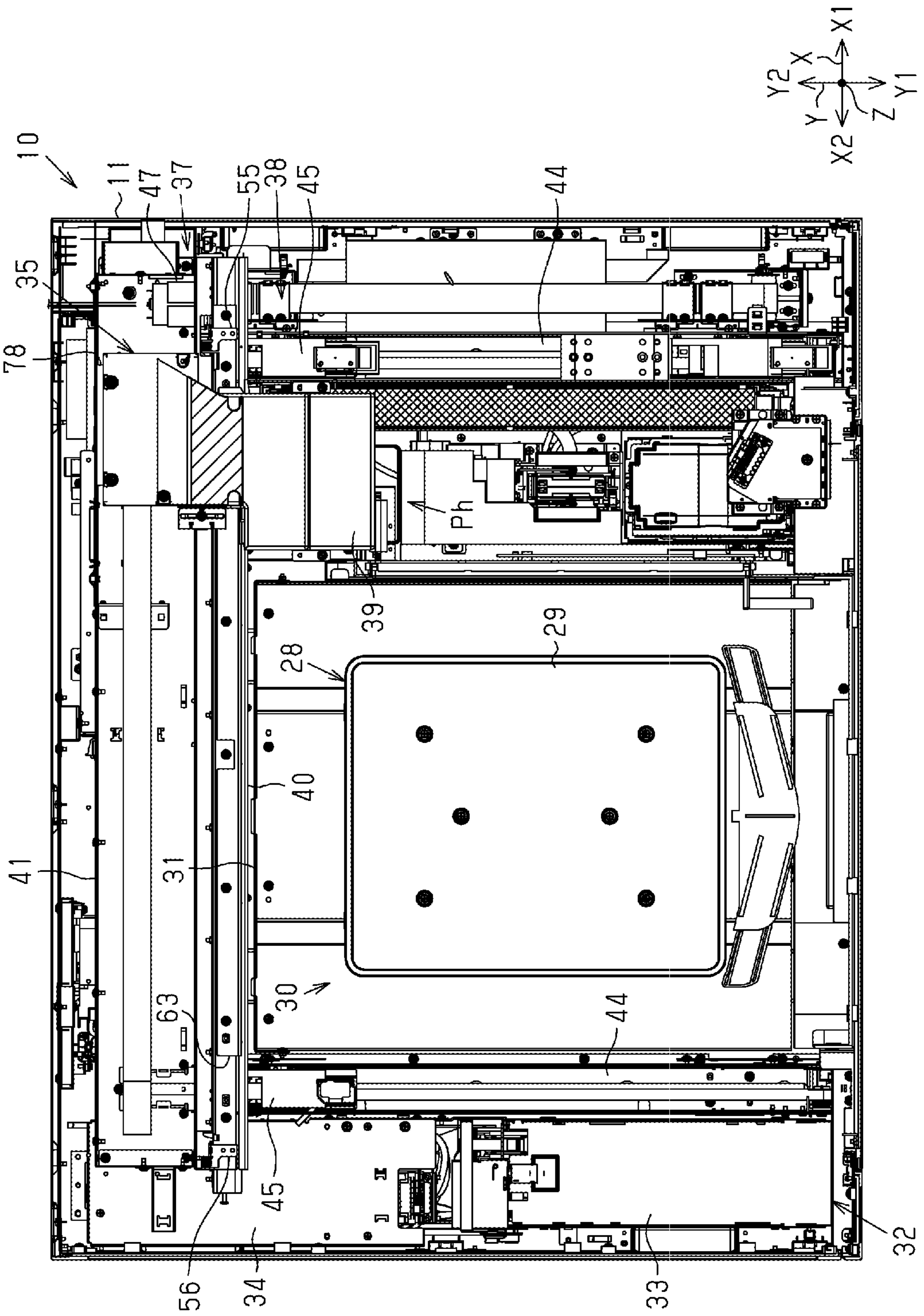
FIG. 2 is a top view showing the printing device.

As shown in FIG. 2, the printing device 10 includes a medium support section 28. The medium support section 28 is configured to support the medium. The medium support section 28 includes a support surface 29. The support surface 29 is a surface facing the upward direction Z1. That is, the vertical direction Z is a direction perpendicular to the support surface 29. The width direction X and the forward and rearward direction Y are directions parallel to the support surface 29. The support surface 29 is configured to support the medium. In particular, the support surface 29 is a surface that supports at least a print region of the medium. The support surface 29 can also be referred to as a placement surface configured to support the medium.

The medium support section 28 is configured so as not to move in a horizontal direction parallel to the support surface 29. In other words, the support surface 29 is configured not to move in the horizontal direction. The medium support section 28 can adjust a position of the support surface 29 with respect to the vertical direction Z.

The printing device 10 may include a medium accommodation section 30. The medium accommodation section 30 is accommodated in the housing 11. The medium accommodation section 30 is provided at least in the width direction X and the forward and rearward direction Y of the support surface 29. In a case where a partial region of the medium is supported by the support surface 29, the medium accommodation section 30 can accommodate a partial region of the medium which is not supported by the support surface 29.

In particular, the medium accommodation section 30 may include an accommodation tray 31. The medium accommodation section 30 includes a region divided by the accommodation tray 31. The accommodation tray 31 may partition the medium accommodation section 30 at least on the rearward direction Y2 side of the support surface 29.

Liquid Supply Section 32

The printing device 10 may include a liquid supply section 32. The liquid supply section 32 is provided further in the second width direction X2 than are the medium support section 28 and the medium accommodation section 30. The liquid supply section 32 is configured to supply liquid to a head 87 (to be described later).

The liquid supply section 32 may include a liquid container 33 and a liquid supply drive section 34. The liquid container 33 is configured to contain liquid to be supplied to the head 87. The liquid container 33 may be a cartridge type which is detachable and attachable, or may be a tank type which can be replenished with liquid. A top surface of the liquid container 33 may be flat.

The liquid supply drive section 34 is driven to supply liquid contained in the liquid container 33 to the head 87. The liquid supply drive section 34 may include a liquid supply pump. A top surface of the liquid supply drive section 34 may be flat.

Printing Section 35

The printing device 10 includes a printing section 35. The printing section 35 is configured to perform printing on the medium. In particular, the printing section 35 is configured to perform printing on the medium supported by the support surface 29. The printing section 35 is movable in the forward and rearward direction Y in a state of straddling the medium support section 28 in the width direction X. The printing section 35 is configured in a gate shape in a front view.

The printing section 35 includes a first movement section 37, a second movement section 38, a head unit 39, and a guide frame 40. The printing section 35 may include an accommodation frame 41.

The guide frame 40 supports the head unit 39 and the first movement section 37. The guide frame 40 may be supported by the accommodation frame 41.

The second movement section 38 may move the first movement section 37, the head unit 39, the guide frame 40, and the accommodation frame 41 in the forward and rearward direction Y. That is, the second movement section 38 moves the first movement section 37 in the forward and rearward direction Y, which intersects the width direction X.

The second movement section 38 may include a pair of rails 44. The pair of rails 44 are provided to the first width direction X1 and to the second width direction X2 of the medium support section 28, with the medium support section 28 interposed therebetween. Each of the pair of rails 44 is configured to extend in the forward and rearward direction Y.

The second movement section 38 may include a pair of support sections 45. The pair of support sections 45 are provided to the first width direction X1 and to the second width direction X2 of the medium support section 28, with the medium support section 28 interposed therebetween. Each of the pair of support sections 45 is configured to support the accommodation frame 41. The pair of support sections 45 are movable in the forward and rearward direction Y along the corresponding pair of rails 44.

Figure 3:
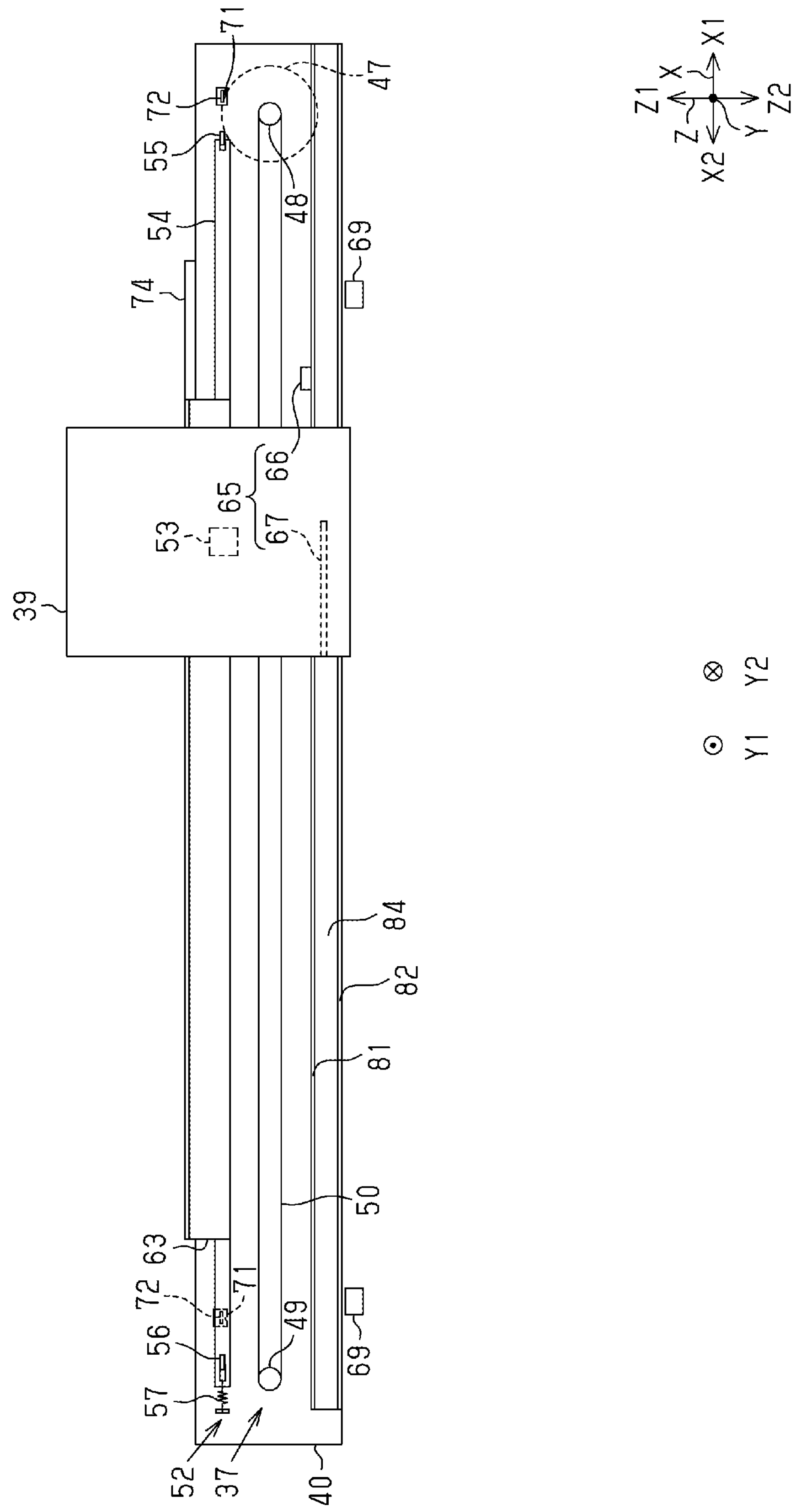
FIG. 3 is a schematic front view of a guide frame and a head unit.

As shown in FIG. 3, the first movement section 37 may include a carriage motor 47, a drive pulley 48, a driven pulley 49, and a timing belt 50.

The drive pulley 48 is connected to an output shaft of the carriage motor 47. The drive pulley 48 and the carriage motor 47 may be indirectly connected via a reduction gear or the like.

The driven pulley 49 is rotatably supported by the guide frame 40. The axes of the drive pulley 48 and the driven pulley 49 are parallel to each other.

The timing belt 50 is an annular belt. The timing belt 50 is wound around the drive pulley 48 and the driven pulley 49. A part of the timing belt 50 is fixed to the head unit 39.

The first movement section 37 transmits driving force of the carriage motor 47 to the head unit 39 through the timing belt 50. The first movement section 37 moves the head unit 39 in the width direction X.

As shown in FIG. 3, the printing section 35 may include a linear encoder 52. The linear encoder 52 may include a linear sensor 53, a linear scale 54, a first scale holding section 55, a second scale holding section 56, and a first spring 57.

The linear scale 54 is for detecting a position of the head unit 39 in the width direction X. The linear scale 54 is fixed to a metal plate constituting the guide frame 40. The linear scale 54 of the present embodiment is fixed to the guide frame 40 via the first scale holding section 55 and the second scale holding section 56. In the linear scale 54, slits are formed at regular intervals in the width direction X.

The linear sensor 53 is provided in the head unit 39. The linear sensor 53 detects the slits formed in the linear scale 54 by being moved in the width direction X. The linear encoder 52 detects the amount of movement of the head unit 39 based on the number of slits detected by the linear sensor 53.

The first scale holding section 55 and the second scale holding section 56 are fixed to the guide frame 40. The first scale holding section 55 and the second scale holding section 56 support the linear scale 54 so as to extend in the width direction X. The first scale holding section 55 holds a first end of the linear scale 54. The second scale holding section 56 holds a second end of the linear scale 54, which is opposite to the first end.

Figure 4:
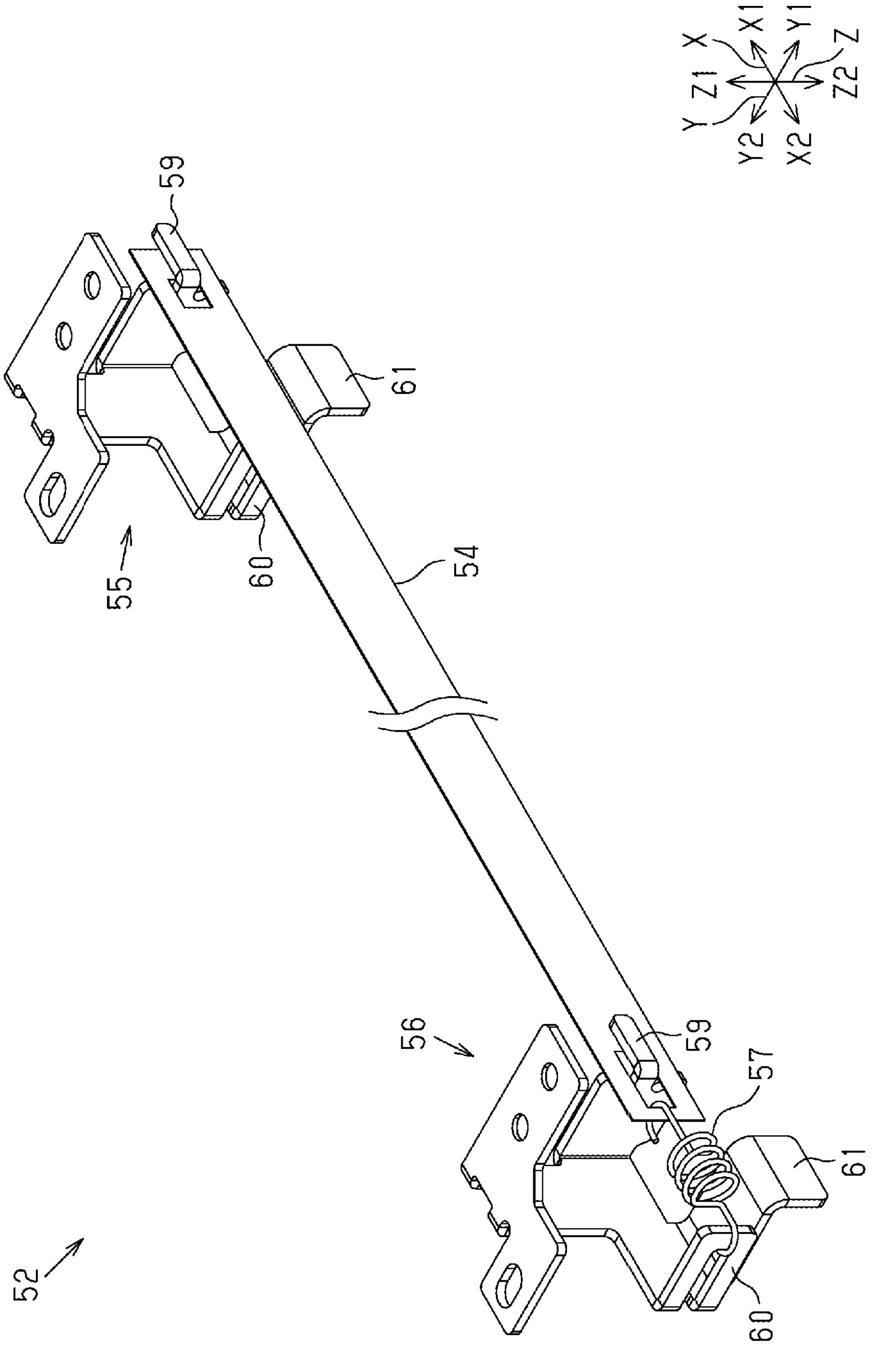
FIG. 4 is a perspective view of a linear encoder.

As shown in FIG. 4, the first scale holding section 55 and the second scale holding section 56 may have the same configuration. Each of the first scale holding section 55 and the second scale holding section 56 may include a claw section 59, a spring receiving section 60, and a stopper 61.

The linear scale 54 is hooked on the claw section 59 of the first scale holding section 55. The claw section 59 of the second scale holding section 56 passes through a hole provided in the linear scale 54.

The spring receiving section 60 of the first scale holding section 55 may support the linear scale 54 from the rearward direction Y2. A first spring 57 is hooked on the spring receiving section 60 of the second scale holding section 56. The first spring 57 applies tension to the linear scale 54.

The stoppers 61 of the first scale holding section 55 and the second scale holding section 56 may restrict movement of the head unit 39. The stoppers 61 may stop the movement of the head unit 39 when the head unit 39 that is reciprocating in the width direction X hits the stoppers 61.

As shown in FIG. 3, the printing section 35 may include a scale cover 63. The scale cover 63 covers a part of the linear scale 54 from the upward direction Z1 and the forward direction Y1. A lower end of the scale cover 63 may be located further in the downward direction Z2 than the linear scale 54. That is, the scale cover 63 makes it difficult for an operator who opens the opening and closing cover 22 from the front of the printing device 10 to touch the linear scale 54. The scale cover 63 may be larger than the accommodation tray 31 in the width direction X.

The printing section 35 may include a home detection section 65. The home detection section 65 includes a home sensor 66 and a rib 67. The home sensor 66 is provided on the guide frame 40. The rib 67 is provided in the head unit 39.

The home sensor 66 is, for example, an optical sensor including a light projecting section and a light receiving section. The light projecting section and the light receiving section may be provided side by side in the vertical direction Z.

The rib 67 may be located between the light projecting section and the light receiving section in the vertical direction Z. When the head unit 39 moves in the first width direction X1, the rib 67 enters between the light projecting section and the light receiving section to block light. In the printing device 10, a home position Ph shown in FIG. 2 may be a position shifted by a predetermined distance in the first width direction X1 from a position where the home sensor 66 detects the rib 67. The size of the rib 67 in the width direction X may be larger than the predetermined distance. That is, the rib 67 may be configured to block light of the home sensor 66 even when the head unit 39 is located at the home position Ph.

The printing device 10 may include at least one assist base 69 located in the downward direction Z2 of the guide frame 40.

The guide frame 40 is made of a flat metal plate. The guide frame 40 may include at least one hooking section 71. The hooking section 71 of the present embodiment is a rectangular through hole that penetrates through the guide frame 40 in the forward and rearward direction Y. A plurality of hooking sections 71 may be provided separately in the width direction X. The hooking section 71 is larger than a hook 72 provided separately from the guide frame 40. The hooks 72 may be provided in the accommodation frame 41.

In a state where the guide frame 40 is assembled, the assist bases 69 and the guide frame 40 do not come into contact with each other, and the hooking sections 71 and the hooks 72 do not come into contact with each other. The assist bases 69 and the hooks 72 may be used when the guide frame 40 is assembled, for example, during manufacturing of the printing device 10. For example, an operator may temporarily place the guide frame 40 using the assist bases 69 and the hooks 72. That is, an operator may temporarily place the guide frame 40 on the assist bases 69. An operator may temporarily hook the hooking section 71 to the hook 72. By temporarily placing the guide frame 40 at a position close to an assembling position, assembling operation of the guide frame 40 can be facilitated.

The printing section 35 may include a spacer 74. The spacer 74 may be provided at the home position Ph. The spacer 74 may be provided on the guide frame 40. The spacer 74 defines the size of a gap between the guide frame 40 and the head unit 39 in the forward and rearward direction Y. The spacer 74 may include an elongated hole (not shown) that is long in the forward and rearward direction Y, and may be fixed to the guide frame 40 in a state in which a position is adjusted along the elongated hole.

Figure 5:
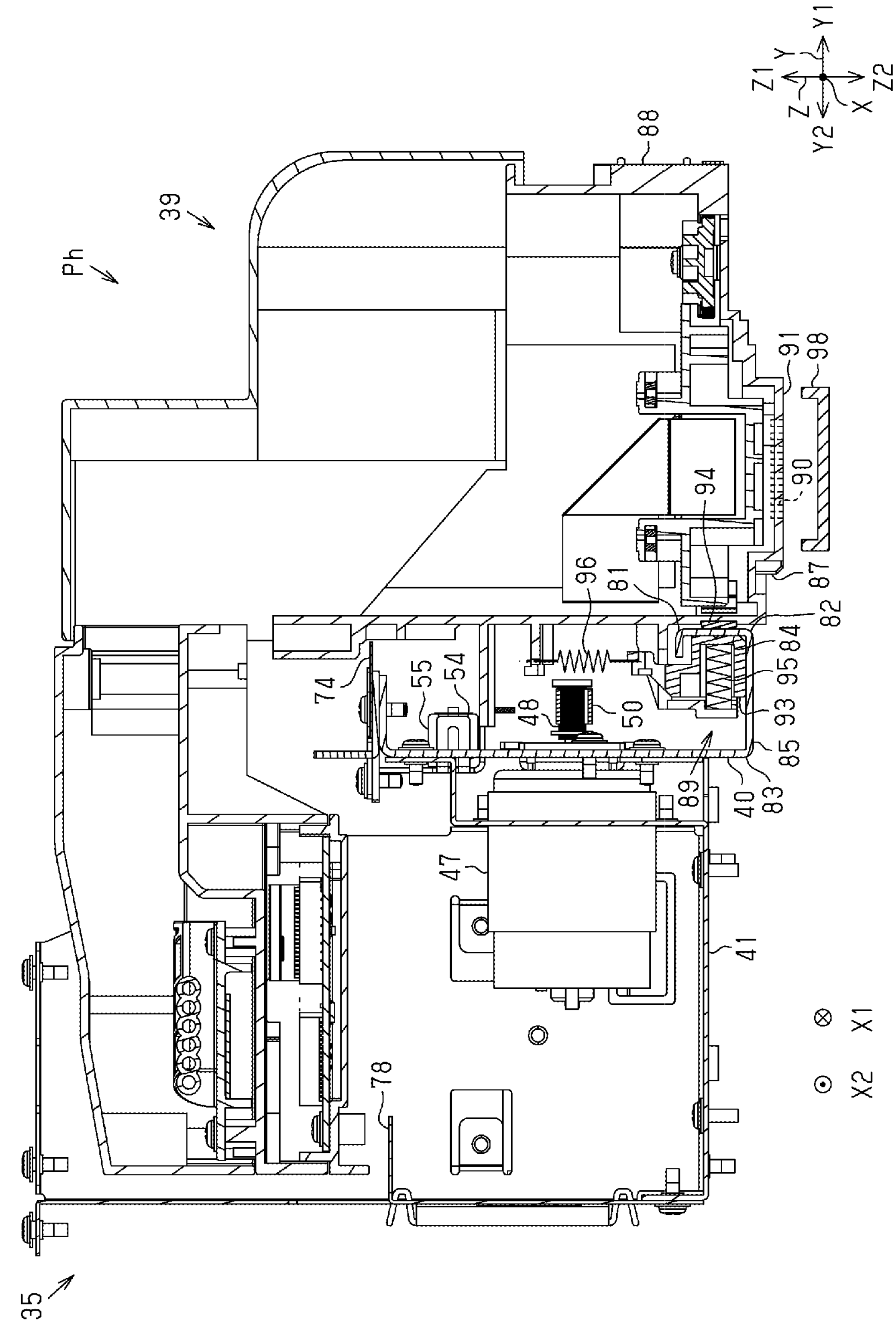
FIG. 5 is a cross-sectional view of the guide frame and the head unit.

As shown in FIG. 5, the accommodation frame 41 may accommodate the carriage motor 47. The accommodation frame 41 may accommodate a cable (not shown) or the like for sending an electric signal to the head unit 39.

The accommodation frame 41 may include a receiving section 78. The receiving section 78 and the head unit 39 may face each other in the vertical direction Z. For example, when the head unit 39 is assembled, the receiving section 78 may receive the head unit 39 that is bent by being screwed on from the upward direction Z1. Since the receiving section 78 restricts deformation of the head unit 39, it is possible to easily assemble the head unit 39.

The guide frame 40 includes a first bent section 81 formed by bending a metal plate along the width direction X and a second bent section 82 formed by bending the metal plate along the width direction X. The guide frame 40 may include a third bent section 83 formed by bending the metal plate along the width direction X.

The guide frame 40 includes a first guide section 84, which is an example of a guide section located between the first bent section 81 and the second bent section 82. The first guide section 84 extends in the width direction X along the vertical plane. The guide frame 40 may include a second guide section 85 located between the second bent section 82 and the third bent section 83. The second guide section 85 extends in the width direction X along the horizontal plane.

The guide frame 40 guides the head unit 39 by the first guide section 84. The guide frame 40 guides movement of the head unit 39 in the width direction X. The first guide section 84 supports the head unit 39 in the forward and rearward direction Y. The second guide section 85 supports the head unit 39 in the vertical direction Z.

Head Unit 39

As shown in FIG. 5, the head unit 39 ejects liquid onto the medium. The head unit 39 may include a head 87, a carriage 88, and a grasping section 89.

The head 87 can eject liquid onto the medium supported by the support surface 29. The head 87 includes a plurality of nozzles 90 and a nozzle surface 91. The nozzle surface 91 is a surface on which each of the plurality of nozzles 90 is opened. Each of the plurality of nozzles 90 can eject liquid.

The carriage 88 is configured to support the head 87. The head 87 is configured as a serial type. In serial types, printing is performed while the head 87 moves in the width direction X.

The grasping section 89 may include a first contact member 93, a second contact member 94, a second spring 95, and a third spring 96.

The first contact member 93 and the second contact member 94 may be made of a wear-resistant resin such as polyacetal. The second spring 95 pushes the first contact member 93 toward the second contact member 94. The second spring 95 presses the first contact member 93 against the first guide section 84. The third spring 96 pulls the carriage 88 against the first contact member 93.

The first contact member 93 is in contact with inner sides of the first guide section 84 and the second guide section 85. The second contact member 94 is in contact with an external side of the first guide section 84. The grasping section 89 grasps the first guide section 84 by the first contact member 93 and the second contact member 94.

The carriage 88 may integrally comprise at least two of the parts that hold the head 87, the linear sensor 53, the first contact member 93, the second contact member 94, the second spring 95, and the third spring 96.

As shown in FIG. 5, the printing device 10 may include a cap 98. The cap 98 is provided directly below the head 87 located at the home position Ph. The cap 98 is configured to reciprocate in the vertical direction Z. The cap 98 rises and comes into contact with the head 87, thereby capping the head 87. When the raised cap 98 pushes up the head unit 39, the head unit 39 comes into contact with the spacer 74, whereby rotation of the head unit 39 about the grasping section 89 is stopped.

Operations of Embodiment

The operations of the present embodiment will be described.

The medium support section 28 may move in accordance with opening and closing of the opening and closing cover 22. For example, the medium support section 28 may rise when the opening and closing cover 22 is opened. The medium support section 28 may move down when the opening and closing cover 22 is closed. The medium support section 28 on which medium is set and that is at the uppermost position in the upward direction Z1 may move in the downward direction Z2 to adjust the distance in the vertical direction Z between the medium and the nozzle surface 91.

The accommodation tray 31 may move in the vertical direction Z in accordance with movement of the medium support section 28. An upper end of the accommodation tray 31 located at the uppermost position in the upward direction Z1 may be located further in the upward direction Z1 than the first guide section 84. That is, the accommodation tray 31 may cover the first guide section 84 from the forward direction Y1. By covering the first guide section 84 with the accommodation tray 31, the first guide section 84 can be protected.

The guide frame 40 reciprocates in the forward and rearward direction Y along the rails 44. The printing section 35 may execute printing in a process of moving the head unit 39 located at the home position Ph to a printing start position in the forward direction Y1 and then moving it in the rearward direction Y2. The head unit 39 performs printing on the medium by ejecting liquid while moving in the width direction X along the guide frame 40.

Effects of Embodiment

The effects of the present embodiment will be described.

(1) The guide frame 40 guides the head unit 39 by the first guide section 84, which is between the first bent section 81 and the second bent section 82. That is, since the first bent section 81 and the second bent section 82 are located on both sides of the first guide section 84, it is possible to increase rigidity of the first guide section 84, for example, compared to a case where a bent section is provided on one side. Therefore, even when the head unit 39 is moved in the width direction X and the forward and rearward direction Y, it is possible to suppress a decrease in printing quality. In particular, when the first movement section 37 is moved in the forward and rearward direction Y by the second movement section 38, a load may be applied to the first guide section 84 in the forward and rearward direction Y, but the first bent section 81 and the second bent section 82 prevent the first guide section 84 from distorting. The head unit 39 is also restricted in the vertical direction Z by the section from the first bent section 81 to the end section of the metal plate in the rearward direction Y2, so that the head unit 39 is less likely separate from the first guide section 84.

(2) The head unit 39 grasps the first guide section 84 by the grasping section 89. That is, the head unit 39 comes into contact with two surfaces of the first guide section 84. Therefore, the head unit 39 can be stabilized as compared with a case where the head unit 39 is brought into contact with one surface of the first guide section 84.

(3) The linear scale 54 is fixed to the metal plate on which the first guide section 84 is formed. Therefore, it is possible to accurately detect a position of the head unit 39 moving along the first guide section 84.

Modifications

The present embodiment can be modified as follows. The present embodiment and the following modifications can be implemented in combination with each other within a range that is not technically contradictory.

The printing section 35 may perform printing when the head 87 moves in either the forward direction Y1 or the rearward direction Y2, or may perform printing both when the head 87 moves in the forward direction Y1 and when the head 87 moves in the rearward direction Y2.

The printing section 35 may perform printing when the head 87 moves in either the first width direction X1 or the second width direction X2, or may perform printing both when the head 87 moves in the first width direction X1 and when the head 87 moves in the second width direction X2.

The head 87 may include the nozzle surface 91 which is parallel to the horizontal plane or may include the nozzle surface 91 which is inclined with respect to the horizontal plane.

The linear scale 54 may be fixed directly to the guide frame 40. For example, the hook 72 may be formed by bending a metal plate constituting the guide frame 40.

The linear scale 54 may be fixed to a member different from the guide frame 40. For example, the linear scale 54 may be fixed to the accommodation frame 41.

The printing section 35 may be configured not to include the linear encoder 52. The printing section 35 may detect the amount of movement of the head unit 39 from, for example, the number of rotations of the carriage motor 47.

The head unit 39 may include one of the first contact member 93 and the second contact member 94. The head unit 39 may be guided by being in contact with one side surface of the first guide section 84. The medium is not limited to, for example, a T-shirt or a polo shirt, but may be, for example, a sweatshirt or a hooded sweatshirt, or may be a medium as clothing. In addition, although a flexible medium is adopted as the medium, the disclosure is not limited to this, and a medium having no flexibility, such as a smartphone case which is printed using UV ink, may be adopted.

The printing device 10 may be configured to eject ink as an example of liquid, or may be configured to eject liquid other than ink. In other words, the liquid can be arbitrarily selected as long as it can print on the medium by depositing to the medium.

Definition

The expression “at least one” as used herein means “one or more” of the desired alternatives. As an example, the expression “at least one” as used herein means “only one option” or “both of two options” if the number of options is two. As another example, the expression “at least one” as used herein means “only one option” or “any combination of two or more options” if the number of options is three or more.

Notes

Hereinafter, technical ideas grasped from the above embodiments and modifications, and operations and effects thereof, will be described.

(A) A printing device includes a head unit configured to eject liquid onto a medium; a first movement section configured to move the head unit in a first direction; a guide frame configured to guide movement of the head unit in the first direction; and a second movement section configured to move the first movement section in a second direction intersecting the first direction, wherein the guide frame includes a first bent section formed by bending a metal plate along the first direction and a second bent section formed by bending the metal plate along the first direction, and guides the head unit by a guide section, which is between the first bent section and the second bent section.

According to this configuration, the guide frame guides the head unit by the guide section, which is between the first bent section and the second bent section. That is, since the first bent section and the second bent section are located on both sides of the guide section, it is possible to increase rigidity of the guide section, for example, compared to a case where a bent section is provided on one side. Therefore, even when the head unit is moved in the first direction and the second direction, it is possible to suppress a decrease in printing quality.

(B) In the printing device, the head unit may include a grasping section configured to grasp the guide section.

According to this configuration, the head unit grasps the guide section by the grasping section. That is, the head unit comes into contact with two surfaces of the guide section. Therefore, the head unit can be stabilized as compared with a case where the head unit is brought into contact with one surface of the guide section.

(C) The printing device may include a linear scale for detecting a position of the head unit in the first direction, wherein the linear scale is fixed to the metal plate.

According to this configuration, the linear scale is fixed to the metal plate on which the guide section is formed. Therefore, it is possible to accurately detect a position of the head unit moving along the guide section.

What is claimed is:

1. A printing device comprising:

a head unit configured to eject liquid onto a medium;

a first movement section configured to move the head unit in a first direction;

a guide frame configured to guide movement of the head unit in the first direction; and a second movement section configured to move the first movement section in a second direction intersecting the first direction, wherein the guide frame includes a first bent section formed by bending a metal plate along the first direction and a second bent section formed by bending the metal plate along the first direction, and guides the head unit by a first guide section, which is between the first bent section and the second bent section;

the head unit includes a grasping section including a pair of contacts and associated pair of springs configured to grasp the first guide section; and the grasping section includes a first contact member disposed on an inner side of the guide frame and a second contact member disposed on an outer side of the guide frame, and grasps the first guide section between the first contact member and the second contact member.

2. The printing device according to claim 1, further comprising:

a linear scale for detecting a position of the head unit in the first direction, wherein the linear scale is fixed to the metal plate.

3. The printing device according to claim 1, wherein the grasping section includes a second spring configured to press the first contact member against the first guide section.

4. The printing device according to claim 1, wherein the guide frame includes a third bent section formed by bending the metal plate along the first direction, and guides the head unit by a second guide section, which is between the second bent section and the third bent section.

5. The printing device according to claim 4, wherein the grasping section includes a third spring configured to press the first contact member against the second guide section.

* * * * *